(12) United States Patent
Kikuchi

(10) Patent No.: US 8,669,317 B2
(45) Date of Patent: Mar. 11, 2014

(54) RUBBER COMPOSITION FOR TIRE

(75) Inventor: Naohiko Kikuchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 23 days.

(21) Appl. No.: 12/741,134

(22) PCT Filed: Sep. 18, 2008

(86) PCT No.: PCT/JP2008/066825
§ 371 (c)(1),
(2), (4) Date: May 3, 2010

(87) PCT Pub. No.: WO2009/069367
PCT Pub. Date: Jun. 4, 2009

(65) Prior Publication Data
US 2010/0256257 A1    Oct. 7, 2010

(30) Foreign Application Priority Data

Nov. 26, 2007   (JP) ................................ 2007-304565

(51) Int. Cl.
*B60C 1/00* (2006.01)
*C08K 3/22* (2006.01)
*C08K 3/40* (2006.01)

(52) U.S. Cl.
USPC ............ 524/432; 524/494; 524/571; 152/905

(58) Field of Classification Search
USPC ................................................. 524/432, 494
See application file for complete search history.

(56) References Cited

U.S. PATENT DOCUMENTS

| | | |
|---|---|---|
| 2005/0032960 A1 | 2/2005 | Kishimoto et al. |
| 2005/0282944 A1 | 12/2005 | Minakoshi et al. |
| 2006/0292356 A1 | 12/2006 | Minagoshi |

FOREIGN PATENT DOCUMENTS

| | | |
|---|---|---|
| CN | 1580111 A | 2/2005 |
| CN | 1891744 A | 1/2007 |
| EP | 1505112 A1 | 2/2005 |
| EP | 1738929 A1 | 1/2007 |
| EP | 1741745 A1 | 1/2007 |
| JP | 8-217918 A | 8/1996 |
| JP | 2005-146208 A | 6/2005 |
| JP | 2005-272602 A | 10/2005 |
| JP | 2006-002119 A | 1/2006 |
| JP | 2006-16527 A | 1/2006 |
| JP | 2007-008988 A | 1/2007 |

OTHER PUBLICATIONS

Search Report dated Sep. 1, 2010 in European Patent Application No. 08855577.6.

*Primary Examiner* — Vickey Nerangis
(74) *Attorney, Agent, or Firm* — Birch, Stewart, Kolasch & Birch, LLP

(57) ABSTRACT

The present invention provides a rubber composition for a tire containing 1 to 20 parts by weight of nonmetal fibers having an average fiber diameter of 15 to 100 μm and 1 to 30 parts by weight of fillers having at least 2 protrusions in which the length of the protrusion is 0.5 to 3.1-fold of the average fiber diameter of the nonmetal fibers, based on 100 parts by weight of a diene rubber and a pneumatic tire using thereof for a purpose of improving frictional performance on ice.

7 Claims, 1 Drawing Sheet

RUBBER COMPOSITION FOR TIRE

TECHNICAL FIELD

The present invention relates to a rubber composition for a tire and a pneumatic tire using thereof.

BACKGROUND ART

Although spike tires have been used and chains have been loaded on tires for running on snow and ice road surface, environmental problems such as dust are generated; therefore studless tires were developed as tires for running on snow and ice road surface in place of these.

Since the snow and ice road surface is remarkably low in frictional coefficient in comparison with general road surface and tires slide easily, the devices of material viewpoint and design viewpoint are carried out. For example, a rubber composition compounding a diene rubber superior in low temperature property is developed. Further, there have been tried devices that surface edge component is increased by changing the uneven mode of tire surface and frictional performance on ice is improved by compounding inorganic fillers having scratch effect (refer to Japanese Unexamined Patent Publication No. 8-217918) to obtain the scratch effect to ice on the snow and ice road surface.

However, frictional performance on the snow and ice road surface is not adequate even by the fore-mentioned studless tires in comparison with spike tires and further improvement is desired.

DISCLOSURE OF INVENTION

The present invention provides a rubber composition for a tire improving frictional performance on ice and a pneumatic tire using thereof.

The present invention relates to a rubber composition for a tire containing 1 to 20 parts by weight of nonmetal fibers having an average fiber diameter of 15 to 100 μm and 1 to 30 parts by weight of fillers having at least 2 protrusions in which the length of the protrusion is 0.5 to 3.1-fold of the average fiber diameter of the nonmetal fibers, based on 100 parts by weight of a diene rubber.

The protrusion of the fillers is preferably 4.

The fillers are preferably zinc oxide whisker.

The average fiber diameter of the nonmetal fibers is preferably 15 to 40 μm.

The nonmetal fibers are preferably glass fiber.

Further, the present invention relates to a pneumatic tire comprising the rubber composition for a tire.

The pneumatic tire satisfies preferably that the ratio of complex elastic modulus E1 to the tread thickness direction of a rubber piece cut out from a tread portion, to complex elastic modulus E2 to a tire peripheral direction is the formula:

$$1.1 \leq E1/E2.$$

BEST MODE FOR CARRYING OUT THE INVENTION

Figure 1:
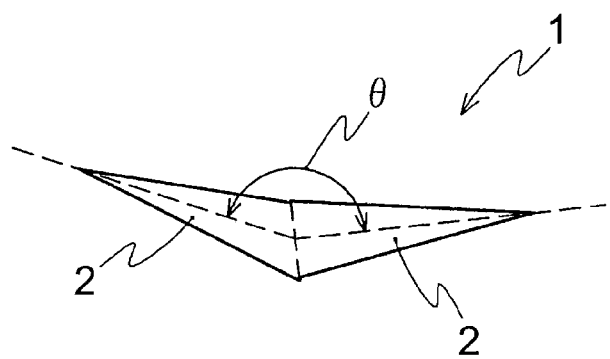
FIG. 1 is the schematic bottom view of fillers having 2 protrusions compounded in the present invention.

The rubber composition for a tire of the present invention comprises a diene rubber, nonmetal fibers and fillers having at least 2 protrusions.

Since nonmetal fibers extruded in a rubber by a calendar roll are oriented to an extrusion direction, there have been required to be used a method of cutting a sheet perpendicular to an extrusion direction and erecting them and a specific procedure (equipment) of orienting fibers to a direction perpendicular to an extrusion direction by making an extrusion head be a tube type, cutting the sheet parallel to the extrusion direction and orienting them to the thickness direction of a tread by respectively rotating them by 90 degrees and duplicating them again, as its production method, in order to effectively express the scratch effect to ice by fibers for orienting to an extrusion direction. However, in the present invention, since the orientation of fiber to the extrusion direction of a rubber is disturbed by compounding fillers with specific dimension having a plurality of protrusions, in the rubber together with nonmetal fibers with specific dimension, the scratch effect to ice of nonmetal fibers can be adequately obtained without using a specific procedure (equipment) in the production of the tire.

Further, a plurality of protrusions exhibit anchor effect by compounding fillers having at least 2 protrusions, dropout caused by stimulation and abrasion at running are prevented and micro protrusions are expressed from rubber surface, water film prepared between snow and ice road surface and a tire is removed by its water repellent effect and frictional performance on ice can be improved.

As the diene rubber used for the rubber composition of the present invention, an arbitrary diene rubber is used. For example, diene rubbers such as a natural rubber (NR), an isoprene rubber (IR), various kinds of polybutadiene rubbers (BR), various kinds of styrene-butadiene copolymer rubbers (SBR), an acrylonitrile-butadiene copolymer rubber (NBR), a butyl rubber (IIR), a halogenated butyl rubber and a polychloroprene (CR) can be used alone or by blending them at an arbitrary proportion. Among these, as the rubber component, NR and BR are preferably used because low temperature property is good and the balance of low temperature property with processability and durability is superior.

The nonmetal fibers used for the rubber composition of the present invention have no fear of damaging road surface and are suitable for securing the grounding of a tread with snow and ice road surface because difference between a rubber and abrasion speed is little. Among the nonmetal fibers, glass fibers or carbon fibers that are bent to an appropriate length during a process of kneading the rubber to be shortened are preferable because dispersion and orientation is easy and a rubber with the appropriate ratio of complex elastic modulus is easily obtained.

The average fiber diameter of the nonmetal fibers is at least 15 μm, preferably at least 20 μm, more preferably at least 25 μm and further preferably at least 30 μm. When the average fiber diameter is less than 15 μm, fibers oriented to a tread thickness direction cannot adequately make a portion having high ground contact pressure prepared on tread surface because the sectional area of the fibers is small. Further, the average fiber diameter of the nonmetal fibers is at most 100 μm, preferably at most 50 μm, more preferably at most 40 μm and further preferably at most 35 μm. When the average fiber diameter of the nonmetal fibers exceeds 100 μm, adherence and adhesion friction do not act adequately because action of pushing out water film which is generated between the snow and ice road surface and tires is inferior.

The average fiber length of the nonmetal fibers is preferably at least 0.1 mm, more preferably at least 0.2 mm and further preferably at least 0.4 mm. When the average fiber length of the nonmetal fibers is less than 0.1 mm, fibers drop out easily from tread surface by running and effect of pushing out water film tends to be lowered. Further, the average fiber length of the nonmetal fibers is preferably at most 5 mm, more preferably at most 3 mm and further preferably at most 2 mm. When the average fiber length of the nonmetal fibers exceeds 5 mm, the fibers are hardly dispersed and oriented and the processability of a rubber tends to be lowered.

The compounding amount of the nonmetal fibers is at least 1 part by weight, preferably at least 1.5 parts by weight and more preferably at least 2 parts by weight based on 100 parts by weight of the diene rubber. When the compounding amount of the nonmetal fibers is less than 1 part by weight, the quantity of fibers forming the ground contact pressure on tread surface is lessened and the effect of removing water film and scratching ice is not adequate. Further, the compounding amount of the nonmetal fibers is at most 20 parts by weight, preferably at most 18 parts by weight and more preferably at most 15 parts by weight based on 100 parts by weight of the diene rubber. When the compounding amount of the nonmetal fibers exceeds 20 parts by weight, tread block rigidity is too high and the tread rubber surface cannot follow the snow and ice road surface; therefore the adherence and adhesion friction is lowered.

The fillers having at least 2 protrusions that are used for the rubber composition of the present invention exhibit superior effect in abrasion resistance, heat resistance and thermal conductivity when they are compounded in the diene rubber.

The fillers have at least 2 protrusions, preferably at least 3 protrusions and more preferably at least 4 protrusions. In case of fillers having no protrusion (a spherical shape) or one protrusion (a linear shape), fillers cannot exhibit anchor effect and fillers drop out by stimulation and abrasion by tire running.

The fillers having at least 2 protrusions include zinc oxide whisker and star sands prepared in Okinawa Prefecture. Among these, zinc oxide whisker is preferably used because it is a material that is harder than ice and softer than asphalt.

Hereat, the number of the protrusion of 2 defines that the opening angle $\theta$ of adjacent protrusions, namely, the angle $\theta$ between a straight line that links the edge of 1 protrusion with the center (inflection point) of the fillers and a straight line that links the edge of adjacent protrusions with the center (inflection point) of the fillers is less than 180 degrees as shown in FIG. 1 that is the schematic bottom view of fillers having 2 protrusions. The opening angle $\theta$ of adjacent protrusions is 180 degrees for the filler having only one protrusion and linear filler such as fiber corresponds to this. The opening angle $\theta$ of adjacent protrusions of fillers having 2 protrusions is preferably at least 90 degrees and more preferably at least 100 degrees. When the opening angle $\theta$ of adjacent protrusions is less than 90 degrees, effect of disturbing the orientation of nonmetal fibers tends to be hardly obtained.

The opening angle $\theta$ of adjacent protrusions of fillers having at least 2 protrusions is preferably at least 90 degrees and more preferably at least 100 degrees from the viewpoint that effect of disturbing the orientation of nonmetal fibers is adequately obtained. Further, the opening angle $\theta$ of adjacent protrusions of fillers having at least 2 protrusions is preferably less than 180 degrees from the viewpoint that when it is 180 degrees, the number of protrusions is 1 and preferably at most 130 degrees from the viewpoint that the orientation of nonmetal fibers is disturbed.

Figure 2:
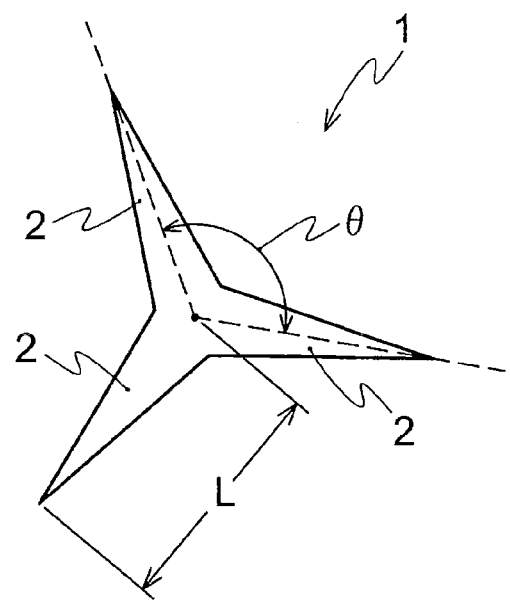
FIG. 2 is the schematic bottom view of fillers having 4 protrusions compounded in the present invention.

FIG. 2 shows the schematic bottom view of fillers having 4 protrusions. The opening angle $\theta$ of adjacent protrusions is preferably 90 to 130 degrees for fillers having 4 protrusions. It is preferable that the opening angle $\theta$ of all adjacent protrusions is 109.5 degrees and respective protrusions are the apexes of a tetrahedral. When the opening angle $\theta$ of adjacent protrusions is less than 90 degrees in fillers having 4 protrusions, nonmetal fibers cannot be entangled between protrusions of the fillers and effect of disturbing the orientation of nonmetal fibers tends to be hardly obtained.

Hereat, the opening angle $\theta$ of adjacent protrusions of the fillers means an angle that is obtained by photographing a microscopic photo to be observed.

The length of the protrusions of the fillers is length from the center (inflection point) of the filler to the edge of the protrusions and means the L of FIG. 2 being the schematic bottom view of fillers having 4 protrusions. The length of the protrusions of fillers is obtained by observing fillers having at least 2 protrusions and measuring arbitrary 50 fillers. And the average length of protrusions per one filler, wherein the length of protrusions is measured, is referred to as the length of the protrusions.

The length of the protrusions of the filler is preferably at least 7.5 μm, more preferably at least 10 μm and further preferably at least 12.5 μm. When the length of the protrusions of the filler is less than 7.5 μm, frictional performance on the snow and ice tends to be not improved. The length of the protrusions of the filler is preferably at most 300 μm, more preferably at most 150 μm and further preferably at most 120 μm. When the length of the protrusions of the filler exceeds 300 μm, abrasion resistance tends to be remarkably lowered.

The length of the protrusions of the filler is at least 0.5-fold of the average fiber diameter of the nonmetal fibers and preferably at least 0.6-fold. When the length of the protrusions of the filler is less than 0.5-fold of the average fiber diameter of the nonmetal fibers, effect of disturbing the orientation of nonmetal fibers is hardly obtained. Further, the length of the protrusions of the filler is at most 3.1-fold, preferably at most 3.0-fold, more preferably at most 2.5-fold, further preferably at most 2-fold and preferably at most 1.5-fold in particular of the average fiber diameter of the nonmetal fibers. When the length of the protrusions of the filler exceeds 3.1-fold of the average fiber diameter of the nonmetal fibers, the protrusions of the fillers fracture occasionally.

In the present invention, definition that the length of the protrusions of the filler is 0.5 to 3.1-fold of the average fiber diameter of the nonmetal fibers means that the length of the shortest protrusions among a plurality of protrusions of the fillers is 0.5 to 3.1-fold of the average fiber diameter of the nonmetal fibers.

The compounding amount of the fillers is not less than 1 part by weight, preferably not less than 1.5 parts by weight and more preferably at least 2 parts by weight based on 100 parts by weight of the diene rubber component. When the compounding amount of the fillers is less than 1 part by weight, frictional performance on ice is hardly improved on snow and ice road surface. Further, the compounding amount of the fillers is not more than 30 parts by weight, preferably not more than 25 parts by weight and more preferably not more than 10 parts by weight based on 100 parts by weight of the diene rubber. When the compounding amount of the fillers exceeds 30 parts by weight, abrasion resistance is lowered.

Further, the surface of the fillers may be treated with a polypropylene (PP), a polyethylene (PE), a polystyrene (PS), a polyurethane (PU), a polyvinyl alcohol (PVA), a silane coupling agent and a silylating agent in order to improve adhesive force with the fillers and the diene rubber.

Further, the rubber composition for a tire of the present invention can further compound reinforcing agents other than the fillers having at least 2 protrusions. As the reinforcing agents, carbon black, silica and/or inorganic fillers represented by the general formula (I) are mentioned.

$$mM \cdot xSiO_y \cdot zH_2O \qquad (1)$$

(M is at least one kind selected from a metal selected from a group comprising aluminum, magnesium, titanium, calcium and zirconium, the oxide and hydroxide of these metals and a hydrate thereof and the carbonate of these metals, and m, x, y and z are numerical constants.)

The compounding amount of carbon black is preferably not less than 5 parts by weight, more preferably not less than 10 parts by weight and further preferably not less than 15 parts by weight based on 100 parts by weight of the diene rubber. When the compounding amount of carbon black is less than 5 parts by weight, adequate reinforcing property is not obtained and abrasion resistance tends to be inferior. The compounding amount of carbon black is preferably not more than 150 parts by weight, more preferably not more than 100 parts by weight and further preferably not more than 70 parts by weight based on 100 parts by weight of the diene rubber. When the compounding amount of carbon black exceeds 150 parts by weight, processability is lowered and frictional performance on ice tends to be lowered because hardness is heightened.

The compounding amount of the inorganic filler is preferably not less than 5 parts by weight, more preferably not less than 10 parts by weight and further preferably not less than 15 parts by weight based on 100 parts by weight of the diene rubber. When the compounding amount of the inorganic filler is less than 5 parts by weight, adequate reinforcing property is not obtained and abrasion resistance tends to be inferior. Further, the compounding amount of the inorganic filler is preferably not more than 150 parts by weight, more preferably not more than 100 parts by weight and further preferably not more than 70 parts by weight based on 100 parts by weight of the diene rubber. When the content of the inorganic filler exceeds 150 parts by weight, processability tends to be lowered.

When silica is compounded, a silane coupling agent is preferably used in combination. The compounding amount of the silane coupling agent is preferably not less than 1 part by weight, more preferably not less than 2 parts by weight and further preferably not less than 4 parts by weight based on 100 parts by weight of silica. When the compounding amount of the silane coupling agent is less than 1 part by weight, the viscosity of the unvulcanized rubber composition tends to be high. Further, the compounding amount of the silane coupling agent is preferably not more than 20 parts by weight, preferably not more than 15 parts by weight and further preferably not more than 10 parts by weight based on 100 parts by weight of silica. When the compounding amount of the silane coupling agent exceeds 20 parts by weight, effect of compounding the silane coupling agent to the compounding amount is little and it tends to cost high additionally.

In the rubber composition for a tire of the present invention, various compounding agents such as a vulcanizing agent (a crosslinking agent), a vulcanization accelerator (a crosslinking accelerator), various oils, an antioxidant and a plasticizer and additives that are compounded for a tire or a general rubber composition can be suitably compounded, in addition to the diene rubber, nonmetal fibers and fillers, a reinforcing agent (a packing agent) and a coupling agent. Further, the compounding amounts of these compounding agents and additives can be also general amounts.

The pneumatic tire of the present invention is produced by a usual method using the rubber composition of the present invention. Namely, the rubber composition of the present invention in which the additives are compounded if necessary is extruded and processed in match with the shapes of respective members of a tire at an unvulcanized state, and the unvulcanized tire is formed by molding the mixture on a tire molding machine by a usual method. A pneumatic tire is obtained by heating and pressuring the unvulcanized tire in a vulcanizer. The pneumatic tire is preferably used for a studless tire because performance on snow and ice road surface can be exhibited in particular.

The rubber composition for a tire of the present invention is preferably used for a tread portion because the pneumatic tire of the present invention is superior in frictional performance on ice. As a method of forming a tread from the rubber composition for a tire of the present invention, extrusion processing by a usual calendar roll can be used, but as described in Japanese Unexamined Patent Publication No. 2001-39104, it is preferable to orient the nonmetal fibers to the direction of a tread thickness by a method of carrying out the rolling processing of the rubber composition in which the fibers are dispersed and folding the rubber sheet obtained.

Specifically, the ratio of complex elastic modulus E1 to a tread thickness direction of a rubber piece cut out from a tread portion, to complex elastic modulus E2 to tire peripheral direction satisfies the formula:

$$1.1 \leq E1/E2.$$

E1/E2 is preferably at least 1.1 and more preferably at least 1.2. When E1/E2 is less than 1.1, a portion with high grounding pressure against grounding surface cannot be adequately formed. As a result, effect of removing water film formed between a tire and snow and ice road surface is little, and adherence and adhesion friction, scratch and digging friction are not improved. Further, E1/E2 is preferably at most 4 and more preferably at most 3.5. When E1/E2 exceeds 4, the rigidity of the tire tread block of a tire is too high; therefore tread rubber surface cannot follow the snow and ice road surface, and adherence and adhesion friction tends to be lowered.

EXAMPLES

The present invention is specifically illustrated based on Examples but the present invention is not limited to only these.

Raw materials used in Examples are shown below in summary.

Natural rubber: RSS#3 manufactured by Techbiehang Co.
Polybutadiene rubber: UBEPOL-BR150B manufactured by Ube Industries, Ltd.
Carbon black: SHOWBLACK N220 available from CABOT JAPAN K. K.
Silica: ULTRASIL VN3 available from Degussa Corporation.
Silane coupling Agent: Si69 (bis(3-triethoxysilylpropyl)tetrasulfide) available from Degussa Corporation.
Oil: DIANA PROCESS OIL PS32 available from Idemitsu Kosan Co., Ltd.
Wax: SUNNOC WAX manufactured by OUCHISHINKO CHEMICAL INDUSTRIAL CO., LTD.
Antioxidant: NOCRAC 6C (N-1,3-dimethylbutyl-N'-phenyl-p-phenylenediamine) available from OUCHISHINKO CHEMICAL INDUSTRIAL CO., LTD.
Stearic acid: STEARIC ACID available from Nihon Oil & Fats Co., Ltd.
Zinc oxide: ZINC OXIDE No. 1 available from Mitsui Mining And Smelting Co., Ltd.
Zinc oxide whisker (1): PANATETRA Trial product (Tetrapod shaped zinc oxide, the number of protrusions: 4, the average length of protrusions (average spicular fiber length): 30.3 μm, the opening angle θ of adjacent protrusions: 109.5 degrees) available from AMTEC Co., Ltd.

Zinc oxide whisker (2): PANATETRA WZ-0501 (Tetrapod shaped zinc oxide, the number of protrusions: 4, the average length of protrusions (average spicular fiber length): 10.9 μm, the opening angle θ of adjacent protrusions: 109.5 degrees) available from AMTEC Co., Ltd.

Zinc oxide whisker (3): PANATETRA Trial product (Tetrapod shaped zinc oxide, the number of protrusions: 4, the average length of protrusions (average spicular fiber length): 16 μm, the opening angle θ of adjacent protrusions: 109.5 degrees) available from AMTEC Co., Ltd.

Zinc oxide whisker (4): PANATETRA Trial product (Tetrapod shaped zinc oxide, the number of protrusions: 4, the average length of protrusions (average spicular fiber length): 16.5 μm, the opening angle θ of adjacent protrusions: 109.5 degrees) available from AMTEC Co., Ltd.

Zinc oxide whisker (5): PANATETRA Trial product (Tetrapod shaped zinc oxide, the number of protrusions: 4, the average length of protrusions (average spicular fiber length): 20 μm, the opening angle θ of adjacent protrusions: 109.5 degrees) available from AMTEC Co., Ltd.

Zinc oxide whisker (6): PANATETRA Trial product (Tetrapod shaped zinc oxide, the number of protrusions: 4, the average length of protrusions (average spicular fiber length): 33 μm, the opening angle θ of adjacent protrusions: 109.5 degrees) available from AMTEC Co., Ltd.

Zinc oxide whisker (7): PANATETRA Trial product (Tetrapod shaped zinc oxide, the number of protrusions: 4, the average length of protrusions (average spicular fiber length): 50 μm, the opening angle θ of adjacent protrusions: 109.5 degrees) available from AMTEC Co., Ltd.

Zinc oxide whisker (8): PANATETRA Trial product (Tetrapod shaped zinc oxide, the number of protrusions: 4, the average length of protrusions (average spicular fiber length): 100 μm, the opening angle θ of adjacent protrusions: 109.5 degrees) available from AMTEC Co., Ltd.

Glass fiber (1): Micro Chopped Strand (Average fiber diameter: 33 μm, cut length (average fiber length): 3 mm) manufactured by NSG VETROTEX K.K.

Glass fiber (2): Micro Chopped Strand (Average fiber diameter: 11 μm, cut length (average fiber length): 3 mm) manufactured by NSG VETROTEX K.K.

Glass fiber (3): Trial product (Average fiber diameter: 101 μm, cut length (average fiber length): 3 mm) manufactured by NSG VETROTEX K.K.

Glass fiber (4): Trial product (Average fiber diameter: 50 μm, cut length (average fiber length): 3 mm) manufactured by NSG VETROTEX K.K.

Sulfur: SULFUR POWDER available from Tsurumi Chemical Industry Co., Ltd.

Vulcanizing accelerator: NOCCELER CZ (N-cyclo hexyl-2-benzothiazolylsulfenamide) manufactured by OUCHISHINKO CHEMICAL INDUSTRIAL CO., LTD.

Examples 1-1 to 3-4

Sulfur and compounding components excluding a vulcanization accelerator that were shown in Table 1 and glass fiber and zinc oxide whisker shown in Tables 2 to 4 were kneaded for 3 to 5 minutes using an enclosed type Banbury mixer with a volume of 1.7 litter, temperature reached to at least 150° C. and then, the compounded rubber was discharged to prepare a base kneaded rubber. Rubber compositions were obtained by kneading the base kneaded rubber, sulfur and a vulcanization accelerator with an open roll and vulcanizing the mixture.

Treads were formed by extruding the obtained rubber compositions to a tread shape with a calendar roll by a method usually used, and tires with a size of 195/65R15 were prepared. Tests below were carried out for the tires obtained.

TABLE 1

|  | Compounding amount (parts by weight) |
|---|---|
| NR | 60 |
| BR | 40 |
| Carbon black | 30 |
| Silica | 20 |
| Silane coupling agent | 2 |
| Naphthenic oil | 30 |
| Antioxidant | 2 |
| Wax | 2 |
| Stearic acid | 2 |
| Zinc oxide | 3 |
| Sulfur | 1.5 |
| Vulcanization accelerator CZ | 1 |

(Complex Elastic Modulus)

Rubber pieces having a shape with a thickness of 1.0 mm, a width of 4 mm and a length of 5 mm were cut out from tire tread portions to prepare measurement samples. Complex elastic moduli ($E1$ and $E2$) to a tread thickness direction and to a peripheral direction were measured at predetermined measurement conditions (a temperature of 25° C., a measurement frequency of 10 Hz, an initial strain of 10% and a dynamic strain of 1%) using a viscoelasticity spectrometer manufactured by Iwamoto Seisakusyo K.K.

(Frictional Performance on Ice)

The pneumatic tires of Examples 1 to 3 were loaded on a test vehicle (a domestically produced FR vehicle of 2000 cc), stopping sight distances on ice board from a speed of 30 km/hr were measured and frictional performance on ice was calculated from the formula below based on the pneumatic tire of Example 1-1.

(Stopping performance index on ice)=(Stopping sight distance of Example 1-1)÷(Stopping sight distance of each of compoundings)×100

The larger the index is, the more superior the frictional performance on ice is. Further, the run-in running of tire surface was respectively carried out at a distance of 100 km before carrying out the test.

(Abrasion Resistance)

The abrasion resistance of rubbers was evaluated at the conditions of the surface speed of test pieces of 40 m/min, a slip rate of 20%, an adding power of 15N and a dropping sand quantity of 20 g/min in accordance with JIS K6264-2, using an improved Lambourn abrasion tester manufactured by Iwamoto Seisakusyo K. K. The abrasion resistance indices were calculated by indices based on the abrasion quantity of the test piece of Example 1-1. The larger the index is, the better the abrasion resistance is.

(Abrasion resistance index)=(Abrasion Quantity of Rubber of Each Compounding)÷(Abrasion quantity of rubber of Example 1-1)×100

Evaluation result is shown in Tables 2 to 4.

TABLE 2

|  | Ex. 1 | | | | | | | |
|---|---|---|---|---|---|---|---|---|
|  | 1-1 | 1-2 | 1-3 | 1-4 | 1-5 | 1-6 | 1-7 | 1-8 |
| Compounding amount (parts by weight) | | | | | | | | |
| Zinc oxide whisker (1) (Length of protrusion: 30.3 μm) | — | — | — | 10 | 1 | 30 | 10 | 10 |
| Zinc oxide whisker (2) (Length of protrusion: 10.9 μm) | 10 | — | — | — | — | — | — | — |
| Glass fiber (1) (Average fiber diameter: 33 μm) | 5 | — | 5 | 5 | 5 | 5 | 1 | 20 |
| Length of protrusion/Average fiber diameter of nonmetal fibers | 0.33 | — | — | 0.92 | 0.92 | 0.92 | 0.92 | 0.92 |
| E1/E2 | 1.18 | 0.96 | 1.20 | 1.12 | 1.19 | 1.10 | 1.00 | 1.25 |
| Evaluation result | | | | | | | | |
| Frictional performance on ice | 100 | 93 | 98 | 115 | 105 | 117 | 101 | 100 |
| Abrasion resistance | 100 | 105 | 100 | 100 | 100 | 99 | 104 | 91 |

Example 1-1 includes zinc oxide whisker and glass fiber, but is the Comparative Example of the present invention in which the length of the protrusions of the filler having at least 2 protrusions is less than 0.5-fold of the fiber diameter of the nonmetal fibers, and is a pneumatic tire that is the basis of evaluation of the frictional performance on ice and abrasion resistance. The pneumatic tires of Examples 1-4 to 1-8 that are Examples of the present invention in which the specific amounts of zinc oxide whisker and glass fiber are compounded and the length of the protrusions of the zinc oxide whisker is 0.5 to 3.1-fold of the average fiber diameter of the glass fiber have the improved frictional performance on ice in comparison with the pneumatic tires of Example 1-2 that does not include zinc oxide whisker and glass fiber and Example 1-3 that includes only glass fiber.

TABLE 3

|  | Ex. 1 | Ex. 2 | | | | | |
|---|---|---|---|---|---|---|---|
|  | 1-1 | 2-1 | 2-2 | 2-3 | 2-4 | 2-5 | 2-6 |
| Compounding amount (parts by weight) | | | | | | | |
| Zinc oxide whisker (2) Length of protrusion: 10.9 μm | 10 | — | — | — | — | — | — |
| Zinc oxide whisker (3) Length of protrusion: 16 μm | — | 10 | — | — | — | — | — |
| Zinc oxide whisker (4) Length of protrusion: 16.5 μm | — | — | 10 | — | — | — | — |
| Zinc oxide whisker (5) Length of protrusion: 20 μm | — | — | — | 10 | — | — | — |
| Zinc oxide whisker (6) Length of protrusion: 33 μm | — | — | — | — | 10 | — | — |
| Zinc oxide whisker (7) Length of protrusion: 50 μm | — | — | — | — | — | 10 | — |
| Zinc oxide whisker (8) Length of protrusion: 100 μm | — | — | — | — | — | — | 10 |
| Glass fiber (1) Length of protrusion: 33 μm | 5 | 5 | 5 | 5 | 5 | 5 | 5 |
| Length of protrusion /Average fiber diameter of nonmetal fibers | 0.33 | 0.48 | 0.5 | 0.6 | 1.00 | 1.52 | 3.03 |
| E1/E2 | 1.18 | 1.19 | 1.17 | 1.12 | 1.12 | 1.14 | 1.15 |
| Evaluation result | | | | | | | |
| Frictional performance on ice | 100 | 105 | 110 | 116 | 115 | 112 | 107 |
| Abrasion resistance | 100 | 100 | 100 | 100 | 100 | 100 | 100 |

Examples of the present invention in which the length of the protrusions of the zinc oxide whisker is 0.5 to 3.1-fold of the average fiber diameter of the glass fiber had the improved performance on ice in comparison with the pneumatic tires of Example 1-1 that is the basis of evaluation and Example 2-1 that is the Comparative Example of the present invention and in which the length of the protrusions of zinc oxide whisker is less than 0.5-fold of the average fiber diameter of the glass fiber.

fiber diameter of the nonmetal fibers, without using specific procedure (equipment) in the production of a tire. Further, frictional coefficient can be heightened by the water repellent effect of micro protrusions protruded from rubber surface, in addition to the scratch effect on ice and snow road surface; therefore a studless tire superior in frictional performance on ice can be obtained. Further, abrasion resistance is not greatly lowered.

TABLE 4

|  | Ex. 1 | Ex. 3 | | | |
| --- | --- | --- | --- | --- | --- |
|  | 1-4 | 3-1 | 3-2 | 3-3 | 3-4 |
| Compounding amount (parts by weight) | | | | | |
| Zinc oxide whisker (1) Length of protrusion: 30.3 μm | 10 | — | 10 | 10 | 10 |
| Zinc oxide whisker (2) Length of protrusion: 10.9 μm | — | 10 | — | — | — |
| Zinc oxide whisker (7) Length of protrusion: 50 μm | — | — | — | — | — |
| Glass fiber (1) Average fiber diameter: 33 μm | 5 | — | — | — | — |
| Glass fiber (2) Average fiber diameter: 11 μm | — | 5 | 5 | — | — |
| Glass fiber (3) Average fiber diameter: 101 μm | — | — | — | 5 | — |
| Glass fiber (4) Average fiber diameter: 50 μm | — | — | — | — | 5 |
| Length of protrusion/Average fiber diameter of nonmetal fibers | 0.92 | 0.99 | 2.75 | 0.30 | 0.61 |
| E1/E2 | 1.12 | 1.15 | 1.15 | 1.10 | 1.13 |
| Evaluation result | | | | | |
| Frictional performance on ice | 115 | 107 | 112 | 95 | 104 |
| Abrasion resistance | 100 | 98 | 98 | 100 | 98 |

In Examples 3-1 to 3-2 that are Comparative Examples of the present invention in which the length of the protrusions of zinc oxide whisker is 0.5 to 3.1-fold of the average fiber diameter of the glass fiber but the average fiber diameter of glass fiber is less than the lower limit of the present invention, the frictional performance on ice is improved but abrasion resistance is lowered. Similarly, Example 3-3 that is Comparative Example of the present invention in which the length of the protrusions of zinc oxide whisker is 0.5 to 3.1-fold of the average fiber diameter of the glass fiber but the average fiber diameter of glass fiber exceeds the upper limit of the present invention keeps abrasion resistance but lowers frictional performance on ice.

| DESCRIPTION OF CODES | |
| --- | --- |
| 1 | Filler having at least 2 protrusions |
| 2 | Protrusions |
| θ | Opening angle of adjacent protrusions |
| L | Length of protrusion |

Industrial Applicability

According to the present invention, scratch effect on ice and snow road surface by nonmetal fibers and fillers having at least 2 protrusions is obtained by compounding specific nonmetal fibers and fillers having at least 2 protrusions in which the length of the protrusions is 0.5 to 3.1-fold of the average

The invention claimed is:

1. A rubber composition for a tire comprising 1.5 to 15 parts by weight of glass fibers having an average fiber diameter of 30 to 40 μm and 2.0 to 25 parts by weight of zinc oxide whiskers having 4 protrusions in which the length of the protrusion is 0.6 to 1.52-fold of the average fiber diameter of the glass fibers, based on 100 parts by weight of a diene rubber.

2. The rubber composition for a tire of claim 1, wherein the zinc oxide whiskers having 4 protrusions and the opening angle θ of adjacent protrusions is 90 to 130 degrees.

3. A pneumatic tire comprising the rubber composition for a tire of claim 1.

4. The pneumatic tire of claim 3, wherein the ratio of complex elastic modulus E1 to a tread thickness direction of a rubber piece cut out from a tread portion, to complex elastic modulus E2 to a tire peripheral direction satisfies the formula:

$$1.1 \leq E1/E2.$$

5. A pneumatic tire comprising a tread formed from the rubber composition of claim 1.

6. The pneumatic tire of claim 5, wherein the ratio of complex elastic modulus E1 to a tread thickness direction of a rubber piece cut out from a tread portion, to complex elastic modulus E2 to a tire peripheral direction satisfies the formula:

$$1.1 \leq E1/E2.$$

7. The pneumatic tire of claim 5, wherein the zinc oxide whiskers having 4 protrusions and the opening angle θ of adjacent protrusions is 90 to 130 degrees.

* * * * *